United States Patent
Shepherd et al.

(10) Patent No.: US 7,274,391 B2
(45) Date of Patent: Sep. 25, 2007

(54) CCD HAVING IMPROVED FLUSHING BY REDUCING POWER CONSUMPTION AND CREATING A UNIFORM DARK FIELD WHILE MAINTAINING LOW DARK CURRENT

(75) Inventors: John P. Shepherd, Rochester, NY (US); Eric J. Meisenzahl, Ontario, NY (US); Richard Brolly, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 855 days.

(21) Appl. No.: 10/268,362

(22) Filed: Oct. 10, 2002

(65) Prior Publication Data

US 2003/0133026 A1    Jul. 17, 2003

Related U.S. Application Data

(60) Provisional application No. 60/347,524, filed on Jan. 11, 2002.

(51) Int. Cl.
H04N 9/64    (2006.01)
H04N 5/335    (2006.01)
H04N 3/14    (2006.01)

(52) U.S. Cl. .................................. 348/243; 348/312
(58) Field of Classification Search ............... 348/241, 348/243, 311, 312, 362, 364, 367
See application file for complete search history.

(56) References Cited

U.S. PATENT DOCUMENTS

| | | | |
|---|---|---|---|
| 4,232,331 A * | 11/1980 | Motoyama et al. | 348/243 |
| 5,115,458 A | 5/1992 | Burkey et al. | 377/58 |
| 5,182,647 A | 1/1993 | Chang | 348/298 |
| 5,693,948 A * | 12/1997 | Sayed et al. | 250/370.09 |
| 5,880,780 A | 3/1999 | Sekiguchi | 348/241 |
| 6,800,870 B2 * | 10/2004 | Sayag | 250/584 |

OTHER PUBLICATIONS

Richard D. Nelson, Accumulation-mode Charge-coupled Device, Nov. 15, 1974, American Institute of Physics, Applied Physics Letters, vol. 25, No. 10, pp. 568-570.*

Albert J. P. Theuwissen, Solid-State Imaging with Charge-Coupled Devices, "1.1.1 MOS Capacitance In Accumulation," Chapter 1, pp. 8-10.

* cited by examiner

Primary Examiner—Vivek Srivastava
Assistant Examiner—Justin P Misleh
(74) Attorney, Agent, or Firm—Peyton C. Watkens

(57) ABSTRACT

A digital camera includes a CCD operating with accumulation mode clocking for capturing an electronic representation of an image; and two or more clocks operatively and respectively connected to each phase of the two or more phases for initiating flushing of excess current, wherein, to initiate flushing, a time the clocks are at a high level are substantially the same, and a time the clocks are at a low level can be selected at any duration between a minimum width at which dark current starts to substantially increase and twice its normal operating duration during image readout and for reducing power consumption while retaining minimum dark current and for having a substantially uniform dark field.

6 Claims, 3 Drawing Sheets

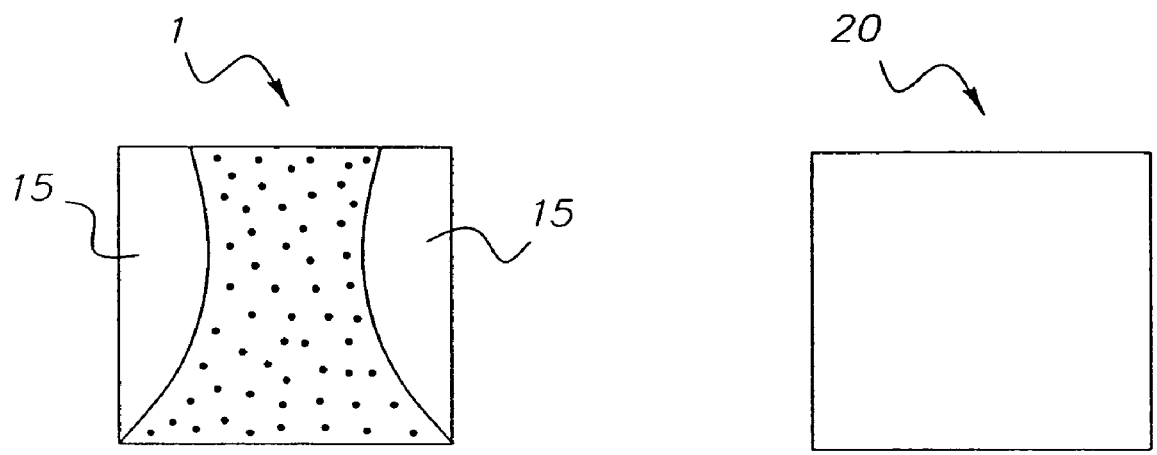
FIG. 2
(PRIOR ART)
FIG. 4
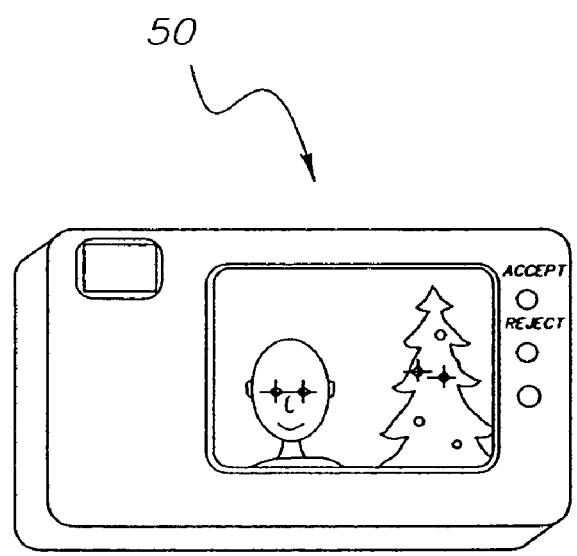
FIG. 5

CCD HAVING IMPROVED FLUSHING BY REDUCING POWER CONSUMPTION AND CREATING A UNIFORM DARK FIELD WHILE MAINTAINING LOW DARK CURRENT

CROSS-REFERENCE TO RELATED APPLICATIONS

Reference is made to and priority claimed from U.S. Provisional Application Ser. No. 60/347,524, filed Jan. 11, 2002, entitled SLOW FLUSH CLOCKING.

The present application is related to U.S. application Ser. No. 10/268,449, filed Oct. 10, 2002, by Gregory O. Moberg et al., and entitled, "A METHOD FOR REDUCING SHUTTER LATENCY WHILE MAINTAINING LOW DARK CURRENT IN AN IMAGER AND MINIMIZING ENERGY CONSUMPTION, " in which reference is made to and priority claimed from U.S. Provisional Application Ser. No. 60/347,551, filed Jan. 11, 2002, entitled "SLOW FLUSH CLOCKING."

FIELD OF THE INVENTION

The invention relates generally to the field of image sensors and, more particularly, to such image sensors having improved flushing of excess charge by reducing the power consumption and creating a uniform dark field while maintaining low dark current.

BACKGROUND OF THE INVENTION

Typically, a true two phase CCD (charge-coupled device) refers to a device in which there are two physical gates over each pixel, with each gate formed in the silicon under it. In this regard, and referring to FIG. 1, there are two-phase voltage lines V1 and V2. This charge-coupling concept is used in frame transfer and interline transfer CCD image sensing.

As is well known in the art, a CCD 1 includes a plurality of pixels 5 for capturing the incident light and converting it into electronic representation. A horizontal shift register 10 receives the charge passed vertically down from the pixels 5, and the shift register 10 eventually passes them out from the CCD 1 for further processing. When initiating image capture, the CCD 1 should be flushed to eliminate undesirable excess charge accumulated during idle periods. In prior art devices, the vertical clocking of the gates during flushing is such that there is a 50% duty cycle in which each clock spends an equal amount of time, $t_p$, at the high and low gate voltage. In addition, the rising edge of V1 is coincident with the falling edge of V2 and vice versa. This provides the condition in which at no time are V1 and V2 at the low gate voltages at the same time until the end of flushing. For clarity of understanding, the vertical clocks (not shown) operate substantially continuously for passing the charge via the horizontal shift register 10 from the CCD 1.

For thoroughness of understanding and as understood by those skilled in the art, the CCD 1 may then capture an image during its integration time which is subsequently readout during image readout. The clocking for these cycles are not shown in their entirety, as they are well known in the art, and few exemplary times are shown for clarity of understanding.

Referring to FIG. 2, there is shown a prior art CCD 1 illustrating its dark field. As illustrated therein, such prior art devices include a non-uniform dark field 15 such that the outer or peripheral portions have a higher dark field than the central or inner portion.

Although the presently known CCDs are satisfactory, they include drawbacks. Such prior art devices have high power consumption during flush and non-uniform dark fields. Such non-uniform dark fields will create a non-uniform background for which correction is required and shot noise from the higher dark current will add to the image noise.

SUMMARY OF THE INVENTION

The present invention is directed to overcoming one or more of the problems set forth above. Briefly summarized, according to one aspect of the present invention, the invention includes a digital camera having (a) a CCD operating with accumulation mode clocking for capturing an electronic representation of an image; and (b) two or more clocks operatively respectively connected to each phase of the two or more phases for initiating flushing of excess current, wherein, to initiate flushing, a time the clocks are at a high level are substantially the same, and a time $t_{low}$ the clocks are at a low level can be shortened from its normal operating duration during image readout to a minimum width, $t_{min}$, at which their dark current starts to substantially increase for reducing power consumption while retaining minimum dark current and for having a substantially uniform dark field. The time $t_{low}$ for the present invention is greater than $t_{low}=t_p$ for the prior art. The time $t_{low}$ can be increased from $t_{min}$ to approximately twice the normal line readout time, $t_{line}$, in order to compromise between increased flush time and reduced power consumption without noticeably affecting dark current.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the following advantages of reducing the power consumption and creating a uniform dark field while maintaining low dark current although flush time will be slightly longer than in the prior art.

BRIEF DESCRIPTION OF THE DRAWINGS

FIG. 2 is an illustration of a dark field in a prior art CCD;

FIG. 4 is an illustration of a uniform dark field of the CCD of the present invention; and FIG. 5 is an illustration of a digital camera for implementing a commercially usable embodiment of the CCD of FIG. 3.

DETAILED DESCRIPTION OF THE INVENTION

Figure 1:
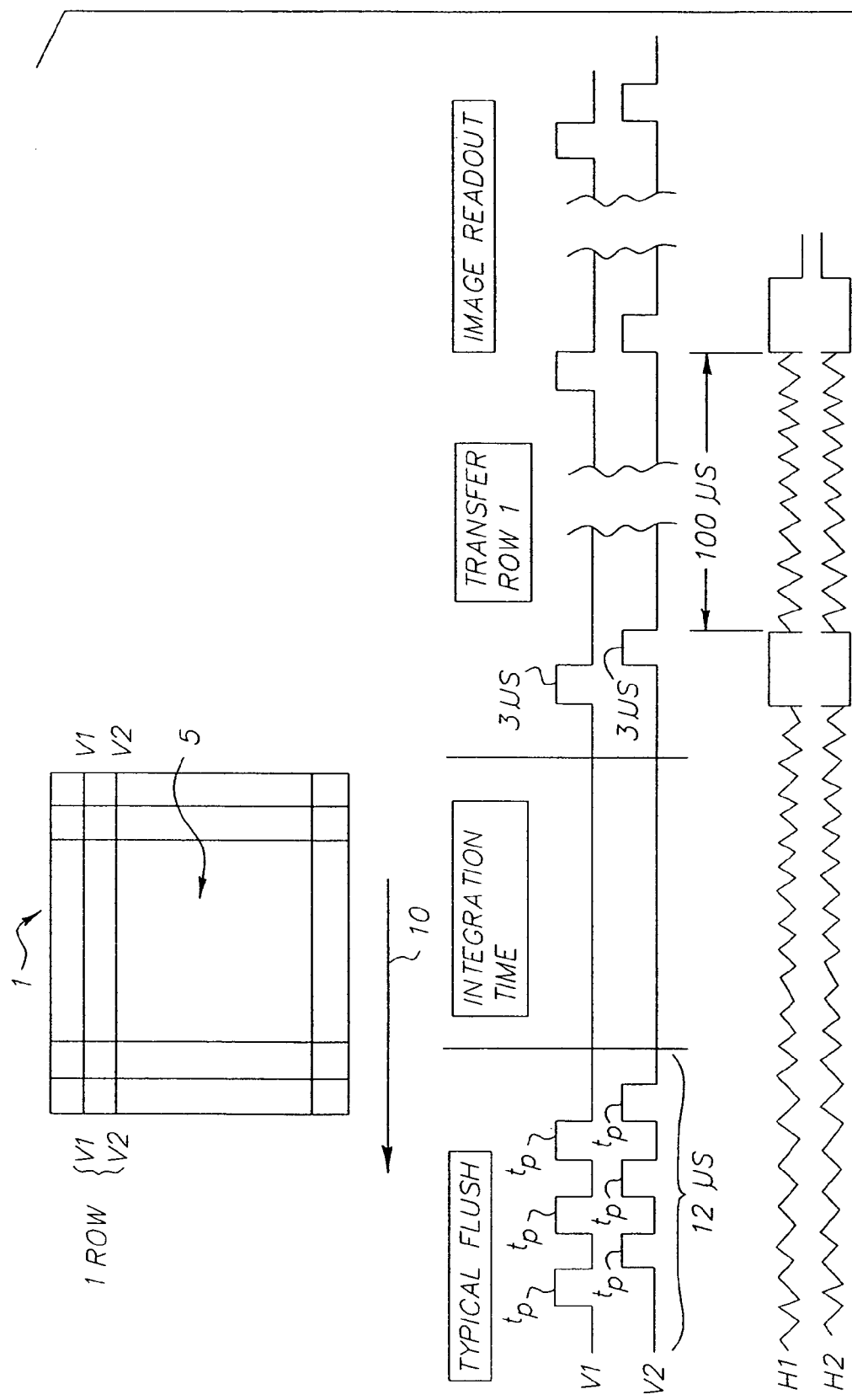
FIG. 1 is a schematic diagram of a prior art sensor and its associated clocking.
Figure 3:
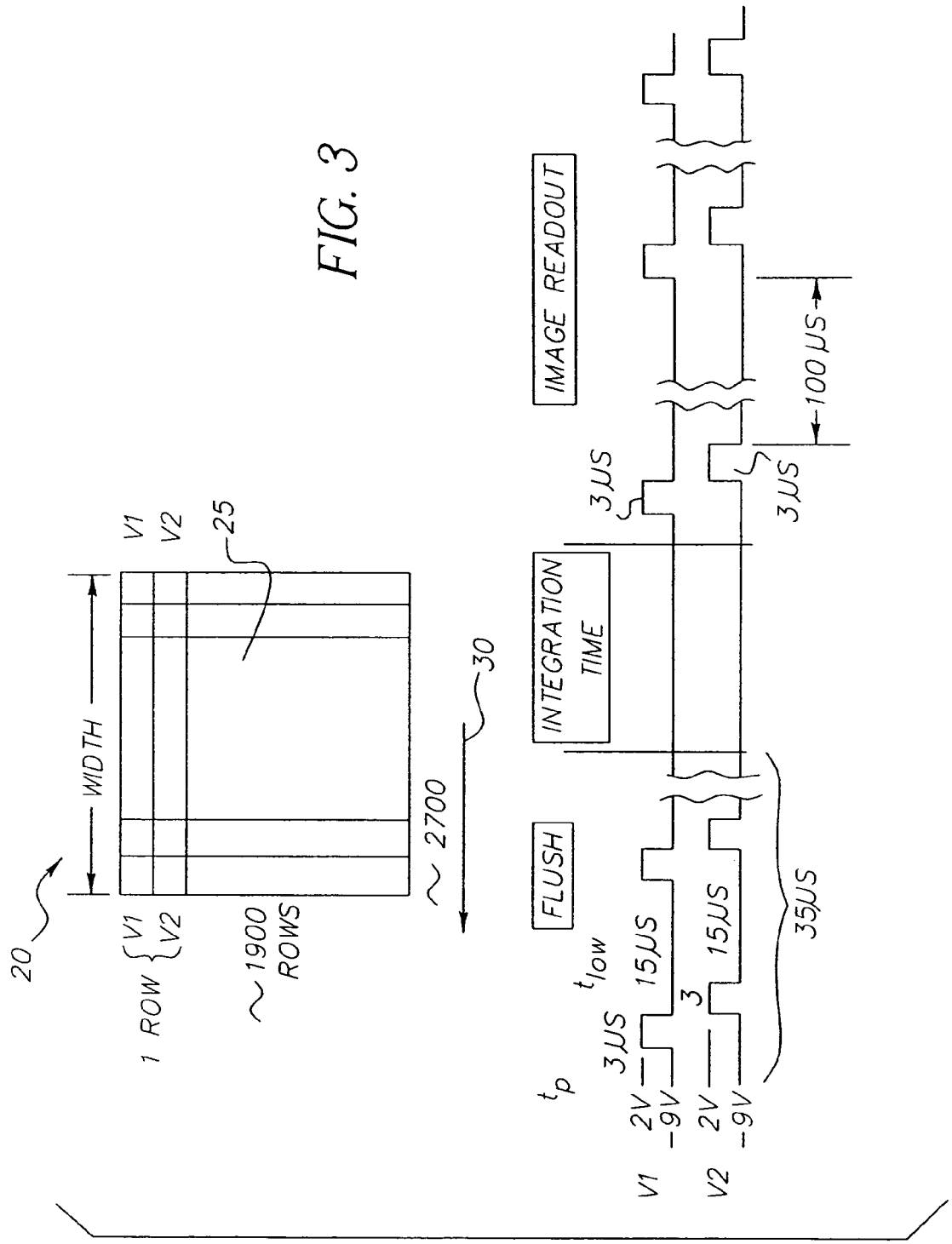
FIG. 3 is a schematic diagram of a CCD of the present invention and its associated clocking.

Referring to FIG. 3, there is shown a two-phase CCD 20 having a plurality of pixels 25 of the present invention with its clocking scheme. The pixels 25 are arranged in an array of rows and columns, 1900×2700 in the preferred embodiment for illustrating an exemplary embodiment, although other configurations are obviously also suitable. It is instructive to note that, although a two-phase device is shown, there may be more than two phases as long as the device can be operated in accumulation mode clocking. Accumulation mode is disclosed in U.S. Pat. No. 5,115,458, by Burkey et al., titled "Reducing Dark Current In Charge Coupled Devices," and in "Solid State Imaging with Charge-Coupled Devices," by Albert J. P. Theuwissen and will not be discussed herein.

In regard to the operation of the present invention during flushing, the vertical clocking includes clocking V1 high for a predetermined time, preferably the minimum time necessary for good vertical transfer efficiency, and V2 is clocked high on the falling edge of V1 for a predetermined time, also preferably the minimum time necessary for good vertical transfer efficiency. The time the clocks V1 and V2 are low is shortened from its normal operating duration during image readout to a minimum width at which their dark current starts to substantially increase for reducing power consumption while retaining minimum dark current. For example, in an Eastman Kodak Company KAF-5101CE sensor, the clocks are preferably clocked high for 3 microseconds and low for 15 microseconds. Those skilled in the art will readily recognize that different lengths of time that the clock voltages are low will vary according to the specific image sensor. The time the clocks are high is substantially proportional to the square of the width of the CCD, or 3 microseconds for the Eastman Kodak Company KAF-5101CE sensor.

The horizontal shift register 30 receives the charges passed as a result of the above clocking and subsequently passes them therefrom for further processing.

For thoroughness of understanding and as understood by those skilled in the art, the CCD 20 may then capture an image during its integration time which is subsequently readout during image readout. The clocking for these cycles are not shown in their entirety, as they are well known in the art, and a few exemplary times are shown for clarity of understanding.

Referring to FIG. 4, there is shown a schematic of the CCD 20 of the present invention illustrating its substantially uniform dark current as illustrated by its uniform density. This is advantageous because this requires little correction of a captured image, and it also has lower noise in the image.

It is instructive to note that the horizontal clocking of the horizontal shift register may run continuously except during the vertical transfer time during image readout (rising edge of V1 to the falling edge of V2). It is instructive to note that other clocking schemes may be used according to the specific use of the CCD.

Referring to FIG. 5, there is shown a digital camera 50 for illustrating a commercially usable embodiment for implementing the CCD 20 of the present invention.

The invention has been described with reference to a preferred embodiment. However, it will be appreciated that variations and modifications can be effected by a person of ordinary skill in the art without departing from the scope of the invention.

PARTS LIST

1 CCD
5 pixels
10 horizontal shift register
15 non-uniform dark field
20 CCD
25 pixels
30 horizontal shift register
50 digital camera

What is claimed is:

1. A digital camera comprising:
    (a) a CCD having an array of pixels arranged in rows and columns with two or more phases per pixel and operating in accumulation mode clocking for capturing an electronic representation of an image; and
    (b) means providing two or more clocks each being operatively and respectively connected to a phase of the pixels in a row for initiating flushing of excess current, and after flushing and capturing an image by the array of pixels reading out such pixels wherein, to initiate flushing, one clock is at its high level when the other clock is at its low level and as the high level is shifted to a low level, the low level is shifted to a high level and then after transfer of a row of excess charge both clocks are at a low level for a predetermined duration which is selected to be longer than the duration that either clock is at a high level to thereby reduce power levels, the predetermined duration being selected to be between a minimum duration at which dark current starts to substantially increase and a maximum of twice the duration of image readout of a row.

2. The digital camera as in claim 1, wherein the time the clocks are high is substantially proportional to a square of a width of the CCD.

3. The digital camera as in claim 1, wherein the CCD is a two-phase CCD.

4. An image sensor comprising:
    (a) a CCD having an array of pixels arranged in rows and columns with two or more phases per pixel and operating in accumulation mode clocking for capturing an electronic representation of an image; and
    (b) means providing two or more clocks each being operatively and respectively connected to a phase of the pixels in a row for initiating flushing of excess current, and after flushing and capturing an image by the array of pixels reading out such pixels wherein, to initiate flushing, one clock is at its high level when the other clock is at its low level and as the high level is shifted to a low level, the low level is shifted to a high level and then after transfer of a row of excess charge both clocks are at a low level for a predetermined duration which is selected to be longer than the duration that either clock is at a high level to thereby reduce power levels, the predetermined duration being selected to be between a minimum duration at which dark current starts to substantially increase and a maximum of twice the duration of image readout of a row.

5. The image sensor as in claim 4, wherein the time the clocks are high is substantially proportional to a square of a width of the CCD.

6. The image sensor as in claim 4, wherein the CCD is a two phase CCD.

* * * * *